United States Patent
Evans et al.

(10) Patent No.: US 9,555,522 B2
(45) Date of Patent: Jan. 31, 2017

(54) SYSTEMS AND METHODS FOR WELDING

(71) Applicant: TOYOTA MOTOR EUROPE NV/SA, Brussels (BE)

(72) Inventors: Paul Evans, Great Abington (GB); Jonathan Blackburn, Burwell (GB); Colin Nigel Ribton, Stapleford (GB); Andrew Christopher Woloszyn, Fulbourn (GB)

(73) Assignee: TOTOTA MOTOR EUROPE NV/SA, Brussels (BE)

( * ) Notice: Subject to any disclaimer, the term of this patent is extended or adjusted under 35 U.S.C. 154(b) by 0 days.

(21) Appl. No.: 14/760,802

(22) PCT Filed: Jan. 25, 2013

(86) PCT No.: PCT/EP2013/051511
§ 371 (c)(1),
(2) Date: Jul. 14, 2015

(87) PCT Pub. No.: WO2014/114353
PCT Pub. Date: Jul. 31, 2014

(65) Prior Publication Data
US 2016/0001427 A1    Jan. 7, 2016

(51) Int. Cl.
*B23K 37/00* (2006.01)
*B23K 37/04* (2006.01)
(Continued)

(52) U.S. Cl.
CPC ........... *B25B 11/002* (2013.01); *B23K 15/006* (2013.01); *B23K 15/0026* (2013.01);
(Continued)

(58) Field of Classification Search
CPC ......... B23K 37/00; B23K 37/04; B23K 15/00; B23K 26/00
(Continued)

(56) References Cited

U.S. PATENT DOCUMENTS 2,421,716 A    6/1947 Rose
6,011,240 A    1/2000 Bishop et al.
(Continued)

FOREIGN PATENT DOCUMENTS

DE    202005003248 U1    6/2005
GB    1438023 A    6/1976
(Continued)

OTHER PUBLICATIONS

Xiao M, et al., "Robotic Nd: YAG Laser welding system and its applications", Aerospace Congress and Exhibition (ACE 2003), 9 pages.
(Continued)

*Primary Examiner* — Samuel M Heinrich
(74) *Attorney, Agent, or Firm* — Andrews Kurth Kenyon LLP

(57) ABSTRACT

A welding fixture including an electromagnet, a non-magnetic support configured to receive at least two sheets of material to be welded, and one or more clamping shoes configured to cooperate with the electromagnet to apply a clamping pressure to the at least two sheets of material and the non-magnetic support as a result of a magnetic force produced by the electromagnet is provided. A first of the at least two sheets of material is in contact with at least one of the one or more clamping shoes, and a second of the at least two sheets of material is in contact with at least the non-magnetic support. The one or more clamping shoes being shaped such that a perimeter defined by the one or more clamping shoes is located in the vicinity of a defined weld line to be welded on the at least two sheets of material, the weld line remaining substantially free from optical obstruction during production of the magnetic force.

22 Claims, 6 Drawing Sheets

(51) Int. Cl.
- *B23K 15/00* (2006.01)
- *B23K 26/00* (2014.01)
- *B25B 11/00* (2006.01)
- *B23K 37/047* (2006.01)
- *B23K 26/32* (2014.01)
- *H01F 7/20* (2006.01)

(52) U.S. Cl.
CPC ........ *B23K 15/0093* (2013.01); *B23K 26/082* (2015.10); *B23K 26/244* (2015.10); *B23K 26/32* (2013.01); *B23K 26/702* (2015.10); *B23K 37/04* (2013.01); *B23K 37/047* (2013.01); *B23K 37/0435* (2013.01); *B23K 37/00* (2013.01); *B23K 37/0408* (2013.01); *B23K 2201/36* (2013.01); *B23K 2203/14* (2013.01); *H01F 2007/208* (2013.01)

(58) Field of Classification Search
USPC ............. 219/121.12–121.14, 121.31, 121.6, 219/121.63, 121.64, 121.82
See application file for complete search history.

(56) References Cited

U.S. PATENT DOCUMENTS

| | | | |
|---|---|---|---|
| 6,127,646 A * | 10/2000 | Aebersold | B23K 26/26 219/121.63 |
| 6,486,436 B1 | 11/2002 | Shah et al. | |
| 2002/0121506 A1 | 9/2002 | Menin et al. | |
| 2005/0269758 A1 | 12/2005 | Sears et al. | |

FOREIGN PATENT DOCUMENTS

| | | |
|---|---|---|
| GB | 2118885 A | 11/1983 |
| KR | 100826469 B1 | 4/2008 |
| WO | 97/26110 A1 | 7/1997 |

OTHER PUBLICATIONS

European Patent Office, International Search Report in International application No. PCT/EP2013/051511, mailed Oct. 28, 2013, 5 pages.

English translation of Office Action dated Oct. 10, 2016 in German Patent Application No. 11 2013 006 508.8.

\* cited by examiner

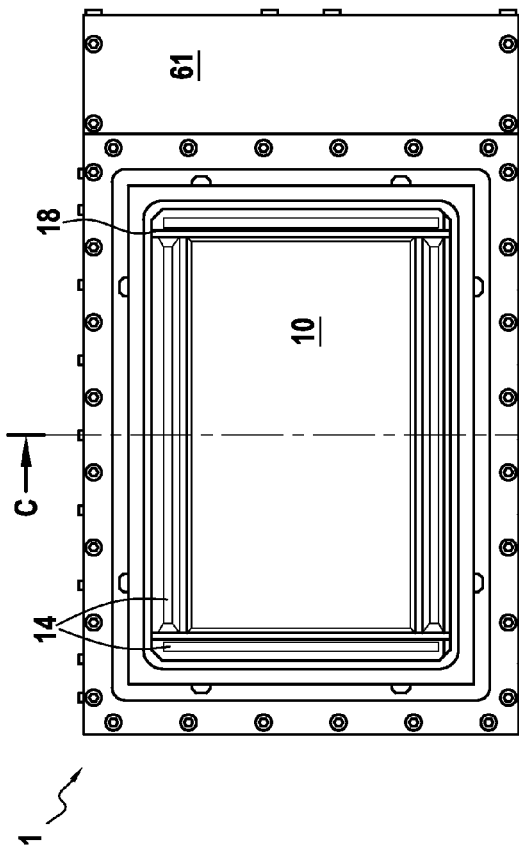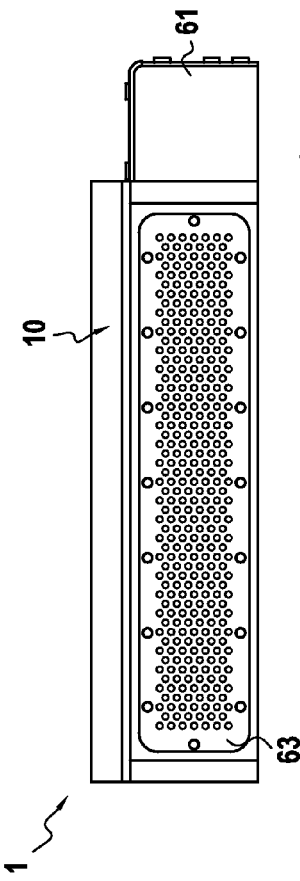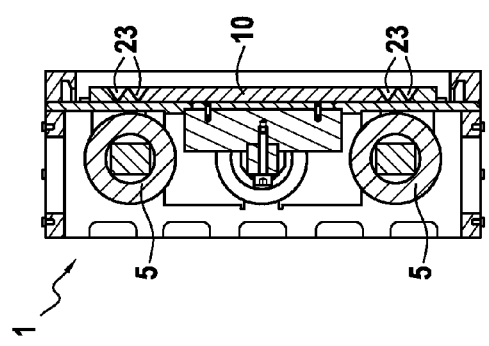

SYSTEMS AND METHODS FOR WELDING

CROSS-REFERENCE TO RELATED APPLICATION

This is a national phase application based on the PCT International Patent Application No. PCT/EP2013/051511 filed Jan. 25, 2013, the entire contents of which are incorporated herein by reference.

FIELD OF THE DISCLOSURE

The present disclosure is related to systems and methods for welding, and more particularly to clamping of thin sheets for facilitating a welding operation.

BACKGROUND OF THE DISCLOSURE

In manufacturing of electronic devices, e.g., batteries, fuel cells, etc., component design often involves various pieces being assembled together by welding, e.g., two or more thin metal sheets.

Typically, such thin metal sheets are positioned together and placed on a welding support. A welding device (e.g., $CO_2$ high energy laser, electron beam/plasma, arc-welder, and/or other similar devices) can then be used to perform a welding operation.

To obtain an effective and complete weld, it is helpful to ensure that the proximal edges of the objects (e.g., thin metal sheets) to be joined are positioned and immobilized during the welding operation. Such immobilization is often accomplished by way of mechanical clamps, the clamps being anchored to fixtures external to the welding support on which the metal sheets have been placed.

The use of mechanical clamps during welding, however, leads to inefficiencies in work-piece production. In particular, mechanical clamping mechanisms require increased time to clamp and unclamp the sheets in position prior to and after welding. A further disadvantage of conventional apparatus is that the increased clamping time resulting from the use of mechanical clamps inhibits adjustment in the positioning of the sheets which are to be welded together once the clamps are engaged.

Magnetic clamping devices have been introduced in an attempt to overcome the deficiencies of the available clamping means. For example, WO97/26110 describes an apparatus for positioning, clamping and welding together proximal edge portions of two sheet blanks. An electromagnet and ferromagnetic clamping shoes act together to hold the two sheets in place such that the edges of the sheets may be butt welded with a laser.

Korean patent application KR100826469 describes a clamping apparatus for laser welding overlapping steel sheets. An electromagnet is configured to act on hydraulically or pneumatically operated clamps to retain a bottom steel sheet and a top steel sheet by way of the magnetic force created by the electromagnet.

British patent GB1438023 describes a system for welding a flange to a pipe, pneumatic actuators controlling a position of the electromagnet so as to retain the flange to be welded.

Xiao M, Bradley P., "Robotic Nd: YAG" Laser welding system and its applications, Aerospace Congress and Exhibition (ACE 2003), describes a laser welding system for welding non-magnetic materials, the system having an electro-magnetic base and equipped with different fixtures for positioning parts. Magnetic clamping shoes are used to clamp the parts based on the magnetic force generated by the electro-magnetic base.

The inefficiencies of the above systems are apparent when trying to perform full peripheral/circumferential laser welds on clamped parts which have optical obstructions due to the clamps and/or support structures related to the clamps.

Moreover, the prior art lacks an effective and efficient system for positioning and removing clamps from the parts being clamped in an electromagnetic clamping system such that repetitive placement and clamping can be performed easily and accurately.

It is accordingly a primary object of the disclosure to provide systems and methods for molding that overcome the deficiencies of the currently available systems and methods.

SUMMARY OF THE DISCLOSURE

In accordance with the disclosure, the systems and methods for welding described herein are intended to aid in overcoming one or more deficiencies present in the prior art.

According to embodiments of the present disclosure, a welding fixture is provided including an electromagnet, a non-magnetic support configured to receive at least two sheets of material to be welded, and one or more clamping shoes configured to cooperate with the electromagnet to apply a clamping pressure to the at least two sheets of material and the non-magnetic support as a result of a magnetic force produced by the electromagnet. A first of the at least two sheets of material is in contact with at least one of the one or more clamping shoes, and a second of the at least two sheets of material is in contact with at least the non-magnetic support, the one or more clamping shoes being shaped such that a perimeter defined by the one or more clamping shoes is located in the vicinity of a defined weld line to be welded on the at least two sheets of material, the weld line remaining substantially free from optical obstruction during production of the magnetic force.

By providing such a system, two or more parts may be welded by a welding device, e.g., a laser welder, electron beam welder, and/or plasma welder, peripherally without interruption, such that upon unclamping, the welded parts are ready for removal from the welding fixture. In addition, with such a fixture "island" clamping may be performed such that an internal clamping portion and an external clamping portion on pieces to be welded are clamped with appropriately shaped central and peripheral clamping shoes, while leaving an intermediate periphery, which is in the vicinity of the weld line, remains free of obstructions to the welding device and further ensuring an accurate weld.

The welding fixture may include a welding device, for example, a laser welding device, an electron beam welding device, or a plasma welding device.

When the welding fixture includes a laser welding device, the laser welding device can be a scanning laser. Such a scanning laser may include a combination of servo motors, mirrors, and/or prisms to enable steering of a beam without displacing the scanning laser device.

The welding device, no matter its type, can be configured for at least one of stake welding and lap welding.

According to embodiments of the disclosure, the at least two sheets of material have a thickness less than 1.0 millimeter, preferably less than 0.5 millimeter. At least one of the at least two sheets of material can include titanium.

The one or more clamping shoes can include a plurality of peripheral clamping shoes and a central clamping shoe configured for island clamping. Further, the one or more clamping shoes are mobile, i.e., movable components.

The electromagnet can be composed of a plurality of electromagnets. Clamping pressure generated by the cooperation between the electromagnet(s) and clamping shoe(s) can range from 20000 pascals to 40000 pascals based on a design of the one or more clamping shoes and/or the electromagnet.

According to embodiments of the present disclosure, a welding system is provided. The welding system may include a welding fixture having an electromagnet, a non-magnetic support configured to receive at least two sheets of material to be welded and one or more clamping shoes configured to cooperate with the electromagnet to apply a clamping pressure to the at least two sheets of material and the non-magnetic support as a result of a magnetic force produced by the electromagnet. The welding system may further include a clamping shoe placement system having a permanent magnet configured to attract the one or more clamping shoes.

By providing such a welding system, an effective and efficient system for positioning and removing clamps from the parts being clamped in an electromagnetic clamping system such that repetitive placement and clamping can be performed easily and accurately, can be realized.

The permanent magnet presents a magnetic field of lesser magnitude than that of the electromagnet in an operational state, relative to the clamping shoes.

The welding system may further include a laser welding device, an electron beam welding device, and/or a plasma welding device. Where the welding system includes a laser welding device, the laser welding device may be a scanning laser.

According to some embodiments, the permanent magnet can include a plurality of permanent magnets aligned to the one or more clamping shoes and/or the electromagnet can include a plurality of electromagnets.

At least one of the at least two sheets of material can include titanium, and a clamping pressure may range from 20000 pascals to 40000 pascals based on a design of the one or more clamping shoes.

According to some embodiments of the present disclosure, a method for welding two or more sheets of material is provided. The method includes supporting the two or more sheets of material on a non-magnetic support, the non-magnetic support being located between the two or more sheets of material and an electromagnet, positioning one or more clamping shoes retained by a clamping shoe placement system such that the one or more clamping shoes contact at least one of the two or more sheets of material, the clamping shoe placement system comprising a permanent magnet for attracting the one or more clamping shoes, operating the electromagnet to generate a magnetic force greater in magnitude than that of the permanent magnet relative to the one or more clamping shoes, and withdrawing the clamping shoe placement system.

Welding of the two or more sheets of material may be performed with a laser welding device, an electron beam welding device, and/or a plasma welding device. In addition, the welding can be performed around a periphery of a weld line without repositioning the one or more clamping shoes.

The method may further include repositioning the clamping shoe placement system in proximity to the one or more clamping shoes, deactivating the electromagnet such that the one or more clamping shoes are retained by the clamping shoe placement system, and removing the at least two sheets of material from the support.

In so doing, a reliable, accurate, and easy manufacturing process may be established with regard to the welding of the sheets of material.

It is to be understood that, except in cases of clear incompatibility and unless otherwise stated, features of one embodiment or example described herein can similarly be applied to other embodiments or examples described herein.

Other features and advantages of the disclosure will become apparent from the following detailed description, taken in conjunction with the accompanying drawings, which illustrate, by way of example, the principles of the disclosure.

It is to be understood that both the foregoing general description and the following detailed description are exemplary and explanatory only and are not restrictive of the disclosure, as claimed.

The accompanying drawings, which are incorporated in and constitute a part of this specification, illustrate embodiments of the disclosure and together with the description, serve to explain the principles thereof.

BRIEF DESCRIPTION OF THE DRAWINGS

FIG. 4A shows a schematic of an exemplary welding fixture according to embodiments of the present disclosure;

FIG. 4B shows a schematic of an exemplary welding shoe placement system according to embodiments of the present disclosure;

FIG. 4C shows a schematic of an electromagnet layout according to embodiments of the present disclosure;

DESCRIPTION OF THE EMBODIMENTS

Reference will now be made in detail to exemplary embodiments of the disclosure, examples of which are illustrated in the accompanying drawings. Wherever possible, the same reference numbers will be used throughout the drawings to refer to the same or like parts.

Figure 1:
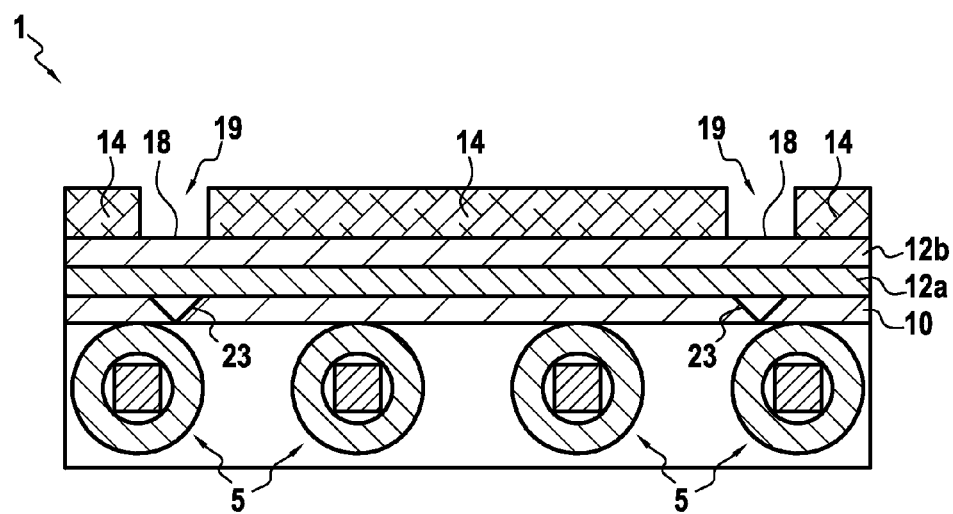
FIG. 1 shows a cross-sectional view of an exemplary welding fixture for welding sheets of material according to embodiments of the present disclosure.

FIG. 1 shows a cross-sectional view of an exemplary welding fixture 1 for welding at least two sheets of material 12a, 12b, according to embodiments of the present disclosure. Any type of material may be welded, magnetic or not-magnetic, and according to some embodiments of the present disclosure, titanium and titanium alloy sheets having a thickness of less than 1.0 millimeter, preferably less than 0.5 millimeter may be welded.

As shown at FIG. 1, an electromagnet 5 may be provided in proximity to a non-magnetic support 10, which may be configured to receive and support at least two sheets of material 12a, 12b to be welded.

Electromagnet 5 is configured to receive an electric current and thereby generate a magnetic field based on passage of the electric current through windings of electromagnet 5. Any suitable type of electromagnet may be implemented, for example, ferromagnetic core, air core, Bitter magnets, etc. Any suitable method for controlling a flow of electric current to electromagnet 5, such as for example, manual and/or computer controlled switches, resistive circuits, etc., may be implemented.

Importantly, although electromagnet 5 is referred to herein in the singular, electromagnet 5 may comprise one or more electromagnets 5 for purposes of generating a magnetic field of a desired geometry and strength.

Further, where more than one electromagnet 5 is implemented, any suitable layout for the multiple electromagnets 5 may be used. For example, see the collection and layout shown at FIG. 4.

According to some embodiments, electromagnet 5 may be housed within a housing relative to non-magnetic support 10. Alternatively, electromagnet 5 may remain external to any housing associated with non-magnetic support 10, but remaining in sufficient proximity to permit transmission of a magnetic field generated by electromagnet 5 through non-magnetic support 10.

Non-magnetic support 10 may comprise any suitable non-magnetic or substantially non-magnetic material, such as, for example, plastic, aluminum, carbon fiber, etc. Notably, materials comprising non-magnetic support 10 may be particularly selected so as to be magnetically permeable, non-reactive with the at least two sheets of material 12a, 12b, and resistant to beams of welding devices, e.g., laser welders, electron welder, plasma welders, etc.

Non-magnetic support 10 may include various sensors located at desired positions within and/or on non-magnetic support 10. For example, pressure sensors, temperature sensors, magnetic flux sensors, etc. Such sensors may be configured to communicate with a monitoring/control system 100 (shown at FIG. 2) for providing information regarding status of, for example, non-magnetic support 10, electromagnet 5, at least two sheets of material 12a, 12b, etc.

Non-magnetic support 10 may be shaped so as to desirably support the two or more sheets of material 12a, 12b to be welded. For example, non-magnetic support 10 may present a flat top portion with surface area corresponding to the two or more sheets of material 12a, 12b. Non-magnetic support 10 may further have one or more grooves 23 located to coincide, for example, with a weld line 18 to be welded on the two or more sheets of material, among other things. One of skill will recognize that various modifications can be made to characteristics of non-magnetic support 10 without departing from the scope of the present disclosure.

Non-magnetic support 10 may further be configured to provide support to one or more clamping shoes 14 which are in turn configured to cooperate with the electromagnet 5 to apply a clamping pressure to the at least two sheets of material 12a, 12b, and non-magnetic support 10 as a result of a magnetic field produced by electromagnet 5. For example, the at least two sheets of material 12a, 12b, may be placed on non-magnetic support 10, with at least a portion of a first of the at least two sheets in contact with non-magnetic support 10. One or more clamping shoes 14 may then be placed in contact with at least a second of the at least two sheets of material such that the at least two sheets of material are positioned between non-magnetic support 10 and one or more clamping shoes 14. Upon activation of electromagnet 5, clamping shoes 14 are drawn toward electromagnet 5, thereby exerting pressure on the at least two sheets of material 12a, 12b, and non-magnetic support 10, the pressure being proportional to the strength of the magnetic field.

Therefore, clamping shoes 14 may comprise magnetic material that when subjected to a magnetic field produced by electromagnet 5, are attracted to electromagnet 5 with greater or lesser force based on the magnitude of the magnetic field and the composition of one or more clamping shoes 14. For example, one or more clamping shoes 14 may comprise iron, steel, nickel, cobalt, etc., and alloys thereof.

Figure 1A:
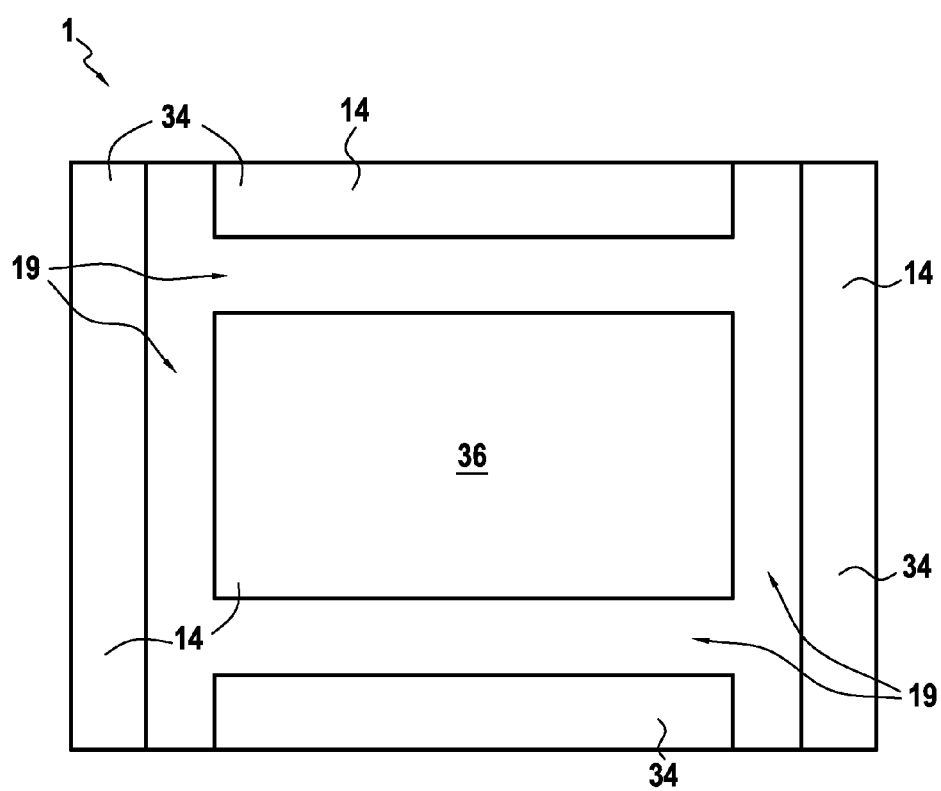
FIG. 1A is a schematic showing an exemplary top view of the welding fixture of FIG. 1.

Clamping shoes 14 may be of any size and shape, and particularly may be configured to define a perimeter located in the vicinity of a defined weld line 18 to be welded on the at least two sheets of material 12a, 12b, such that weld line 18 remains substantially free from optical obstruction during production of a magnetic field by electromagnet 5. For example, a clamping configuration such as that shown at FIG. 2 may be desired. In such a configuration, a central clamping shoe 36 (e.g., an "island") may be surrounded by one or more peripheral clamping shoes 34 such that weld line 18 is located in an uninterrupted gap 19 between the one or more peripheral clamping shoes and the central clamping shoe 36. In other words, an uninterrupted gap 19 is presented near a periphery of the central clamping shoe 36 such that a continuous weld can be accomplished. FIG. 1A is a schematic showing an exemplary top view of the welding fixture of FIG. 1, demonstrating an example of such a gap 19.

Importantly, such a configuration can be implemented for polygonal shapes, circular shapes, and any number of other concentric shapes leaving a gap 19 for an unobstructed weld line, while still applying a desired pressure to the at least two sheets to be welded 12a, 12b.

It should be noted that it is possible to implement an "island" type clamping configuration using only central clamping shoe 36. In other words, in the absence of one or more peripheral clamping shoes 34, central clamping shoe 36 may be used to provide a desired clamping pressure, thereby resulting in an unobstructed area surrounding central clamping shoe 36. Moreover, clamping of the at least two sheets of material 12a, 12b, may also be accomplished in other configurations, such as, for example, using only peripheral clamping shoes 34, as desired. One of skill in the art will recognize that any such configuration falls within the scope of the present disclosure.

Figure 2:
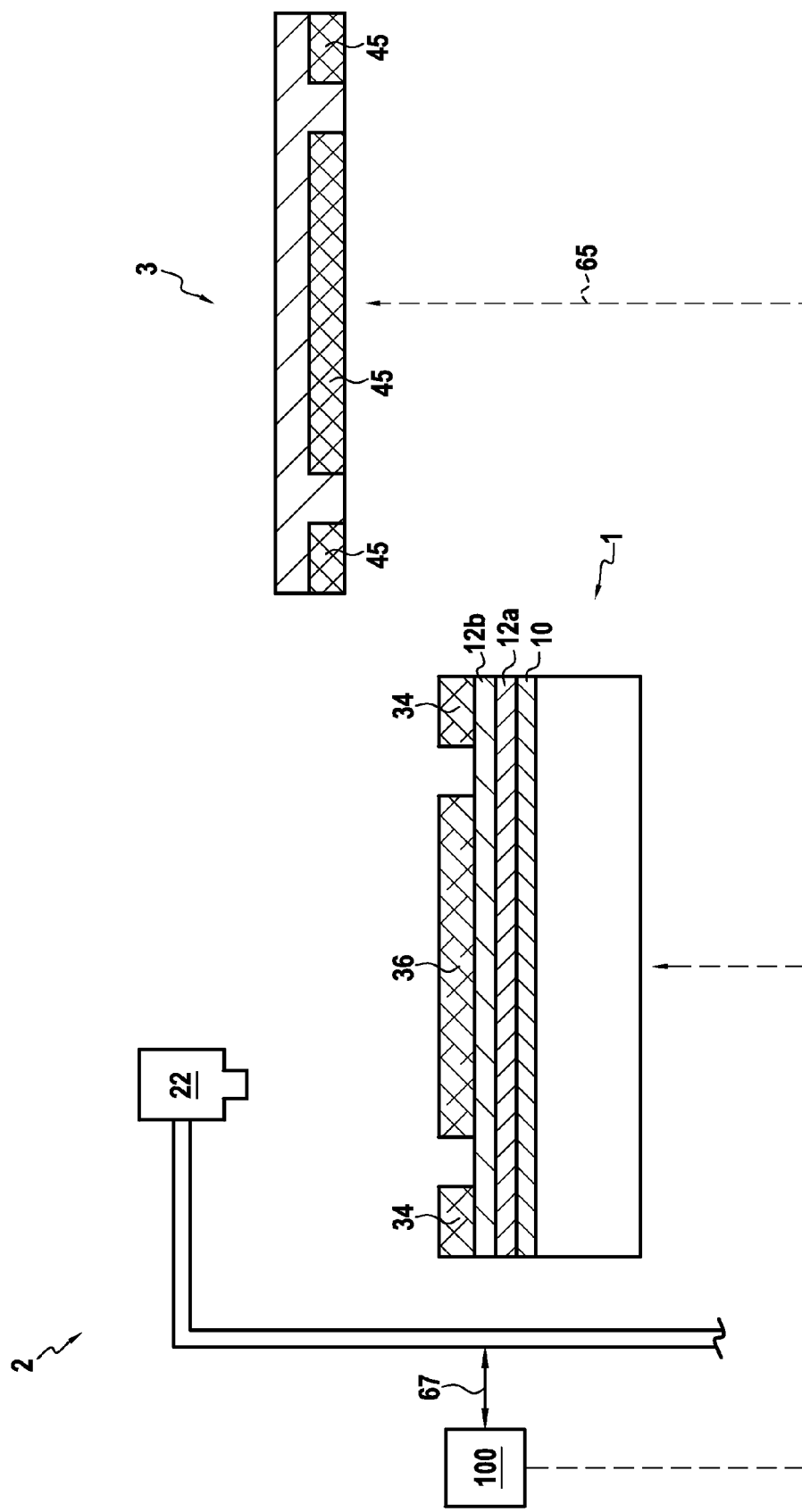
FIG. 2 shows an exemplary welding system according to embodiments of the present disclosure.

FIG. 2 shows an exemplary welding system 2 according to the present disclosure and highlights an exemplary "island" clamping configuration. Importantly, welding system 2 is not intended to be limited for use with an "island" clamping configuration, and any desired clamping configuration may be used with welding system 2 (e.g., peripheral clamping system).

As shown at FIG. 2, welding system 2 may include a welding fixture similar to welding fixture 1, the components of which will not be described again in detail, and a clamping shoe placement system 3 configured to place and remove one or more clamping shoes 14.

Welding system 2 further includes a welding device 22, e.g., a laser welding device, an electron beam welding device, a plasma welding device, etc. for welding, e.g., stake welding and/or lap welding the at least two sheets of material 12a, 12b. According to some embodiments, where a laser welding device is used, the welding device 22 may be a scanning laser (i.e., a laser having one or more mirrors and/or prisms used for directing a laser beam).

Welding device 22 may be operated by way of a CAD-CAM (computer aided drafting-computer aided manufacturing) and various robotic components (not shown), or other similar systems such that, for example, controller 100 causes welding device 22 to weld the at least two sheets of material 12a, 12b along a defined weld line 18 in the vicinity of the periphery of one or clamping shoes 14. For example, where a scanning laser welding device is used, controller 100 may manipulate mirrors and/or prisms (e.g., using servo motors and/or other suitable devices) responsible for "steering" a laser beam from the laser welder such that weld line 18 is accurately followed with minimal or no movement of welding device 22.

As noted above, because weld line 18 is free from optical obstruction with regard to welding device 22 while electromagnet 5 is operating, an entire peripheral welding process may take place without further manipulation of the at least two sheets 12a, 12b or parts of welding fixture 1.

Clamping shoe placement system 3 may include one or more permanent magnets 45 configured to attract the one or more clamping shoes 14 based on magnetic forces generated by the one or more permanent magnets 45. In addition, clamping shoe placement system 3 may include various robotic components (not shown) configured to manipulate clamping shoe placement system 3 so as to position one or more clamping shoes 14 in contact with at least one of the at least two sheets of material 12a, 12b.

The one or more permanent magnets 45 may include any type of magnet, for example, rare earth, iron, alnico, etc. Particularly, permanent magnets 45 should be configured such that permanent magnet 45 presents a magnetic field of lesser magnitude than that of electromagnet 5 in an operational state (e.g., maximum power, minimum power, normal range, etc), relative to the one or more clamping shoes 14. According to some embodiments, the magnetic field of electromagnet 5 may be varied so as to arrive at such a condition. Alternatively, or in addition, permanent magnets 45 may be designed such that their magnetic field is less than that of electromagnet 5 when operating at a condition considered "normal" for electromagnet 5 (e.g., with a designed current flow).

Permanent magnet 45 may be comprised of one or more permanent magnets 45, such permanent magnets 45 being aligned to one or more clamping shoes 14. In other words, permanent magnets 45 may be positioned within clamping shoe placement system 3 such that, upon locating clamping shoe placement system 3 in proximity to welding fixture 1, one or more clamping shoes 14 present on welding fixture 1 may be subject to the magnetic field of the one or more permanent magnets 45.

Notably, clamping pressures generated by the exemplary welding fixtures and systems described can range between 20000 pascals to 40000 pascals, based on a design of the one or more clamping shoes 14 and electromagnet 5. One of skill understands that magnetic fields generated by electromagnets can be varied based on, among other things, the number of wire windings (N) about a core and current (i) passing through the windings. In addition, depending on length, width, and material of one or more clamping shoes 14, the pressure exerted on the sheets 12a, 12b and non-magnetic support 10 as a result of the magnetic field acting on the clamping shoes 14 from electromagnet 5 may also be varied.

Figure 3:
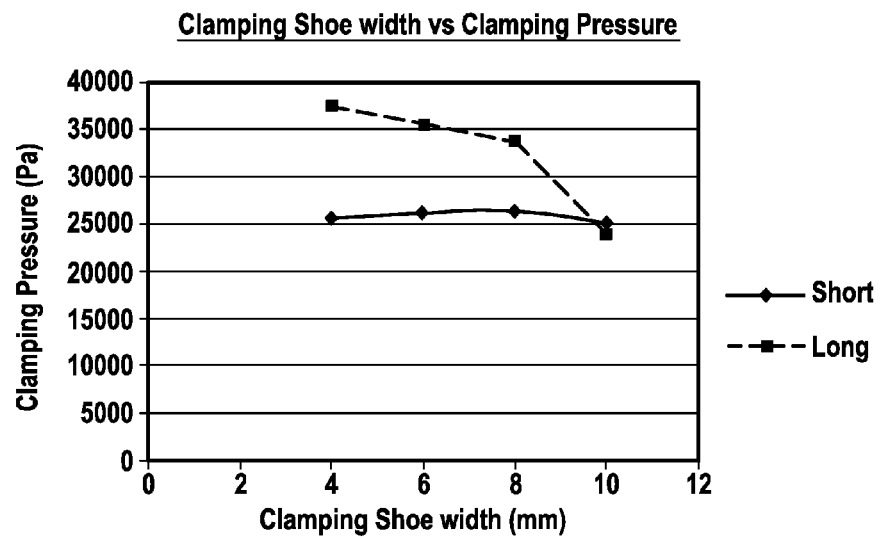
FIG. 3 is a graph showing clamping pressures based on clamping shoe design.

FIG. 3 is a graph showing clamping pressures based on clamping shoe width for a 27 cm "long" clamping shoe design and a 20 cm "short" clamping shoe design based on a single value for a magnetic field produced by electromagnet 5. As can be seen, the clamping pressures obtained can be made relatively constant which may be beneficial when welding very thin sheets of material.

Figure 4:
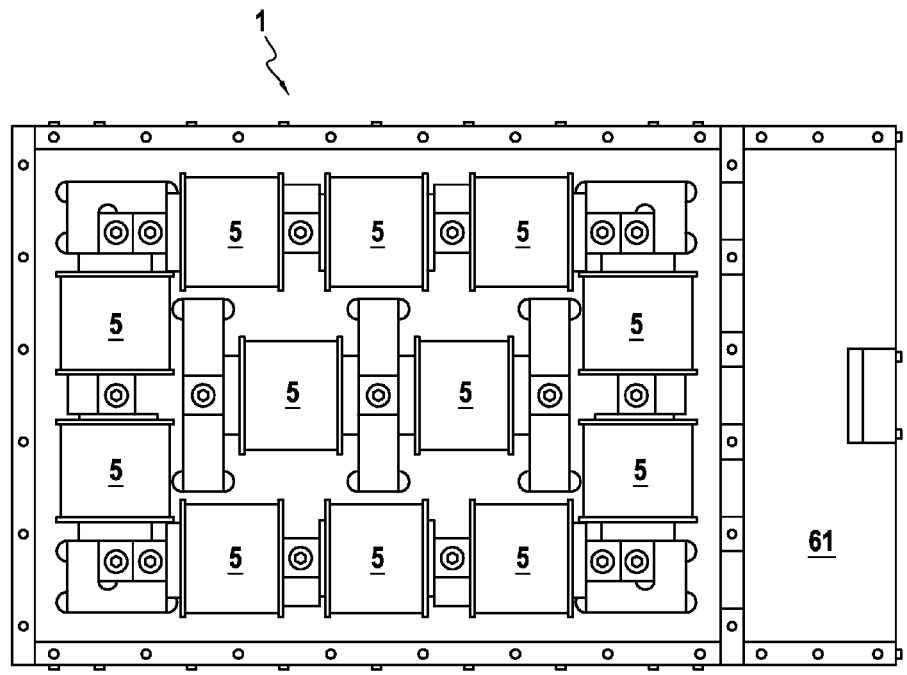
FIG. 4 is a schematic showing an exemplary collection and layout of electromagnets according to embodiments of the present disclosure.

FIG. 4 and its subfigures 4A-E are schematic drawings showing various features of welding systems according to embodiments of the present disclosure. For example, as noted above, FIG. 4 shows one exemplary collection and layout of electromagnets 5. This example is not intended to be limiting and any suitable layout may be used.

FIG. 4A is an overhead view of an exemplary welding fixture 1, similar to that shown at FIG. 1. Such a fixture may further include a housing 61 surrounding, for example, a power supply (not shown) for electromagnets 5. One of skill in the art will recognize that various other configurations may be used.

FIG. 4B is a schematic side-view representation of welding fixture 1, demonstrating the presence of an optional cooling structure 63 (e.g., screen, fan, etc.) to enable airflow over electromagnets 5, while FIG. 4C is a cross-section view of welding fixture 1 taken along line C-C.

Figure 4D:
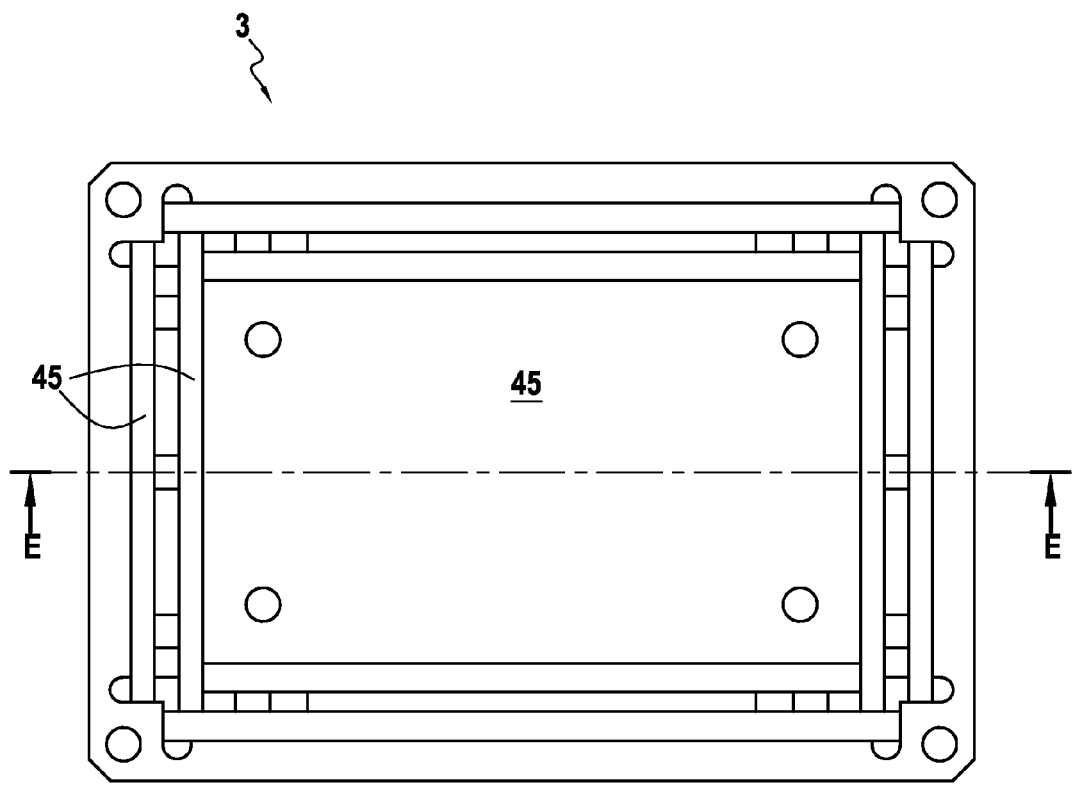
FIG. 4D is a schematic representation of an exemplary clamping shoe placement system.
Figure 4E:
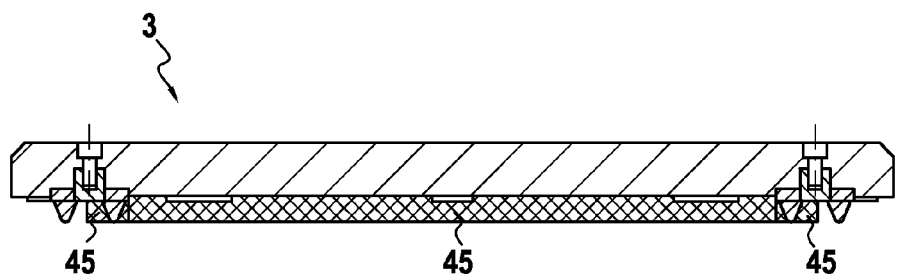
FIG. 4E is a cross-section view of the FIG. 4D system taken along line E-E.

FIG. 4D is a schematic representation of an exemplary clamping shoe placement system 3, while FIG. 4E is a cross-section view of the FIG. 4D system taken along line E-E.

Figure 5:
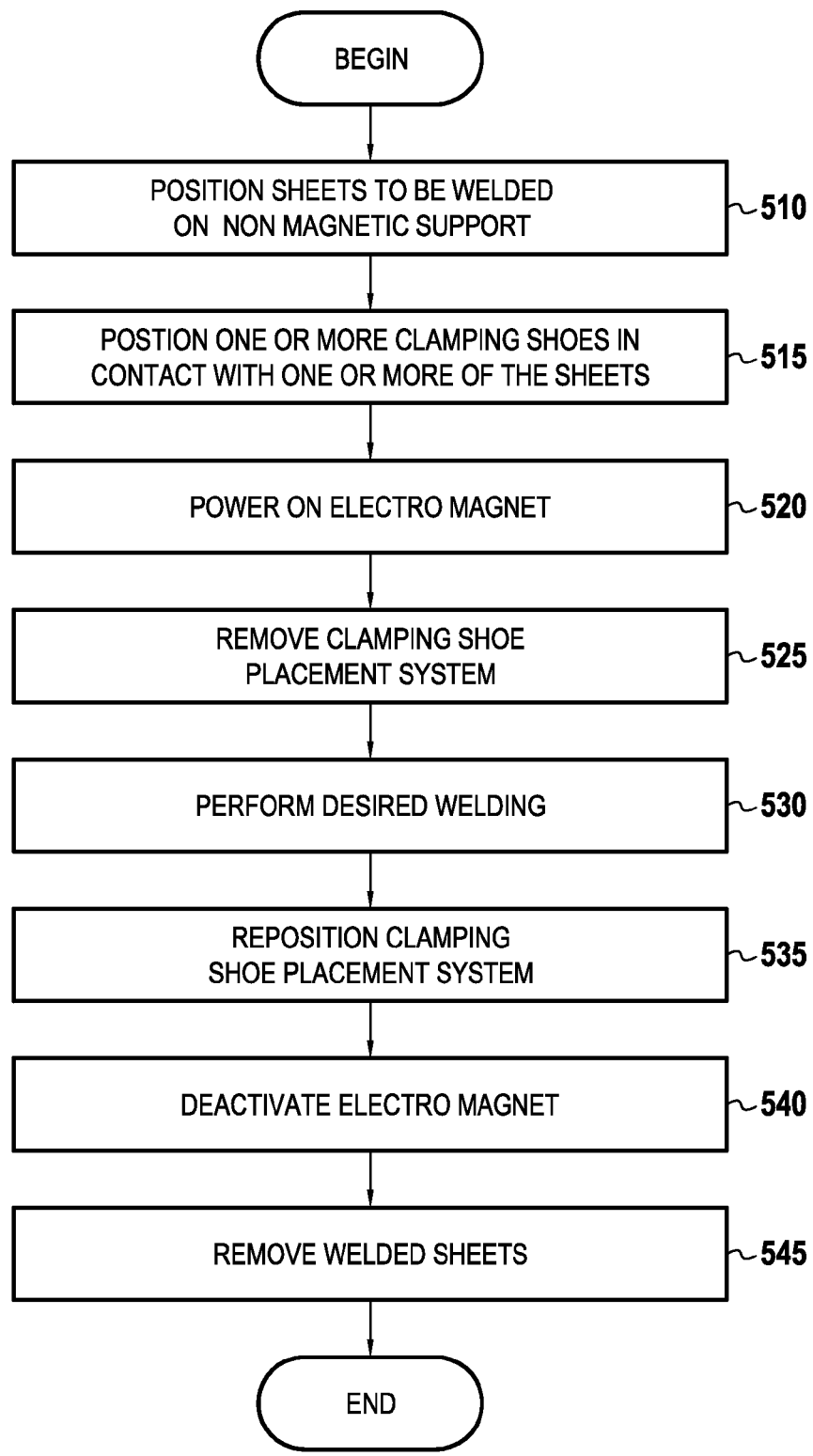
FIG. 5 is a block diagram of an exemplary method for operating welding systems according to embodiments of the present disclosure.

FIG. 5 is a block diagram 500 of an exemplary method for operating welding systems 3 according to the present disclosure. Two or more sheets of material 12a, 12b to be welded may be placed on non-magnetic support 10 for supporting the sheets 12a, 12b during a welding operation (step 510). In other words, non-magnetic support 10 should be located between electromagnet 5 and the two or more sheets of material 12a, 12b.

One or more clamping shoes 14 may then be positioned (step 515), for example by clamping shoe placement system 3 (e.g., by robotic control), such that the one or more clamping shoes 14 contact at least one of the two or more sheets of material 12a, 12b. As a result of permanent magnets 45 of clamping shoe placement system 3, one or more clamping shoes 14 may be attracted to clamping shoe placement system 3, allowing clamping shoe placement system to manipulate the one or more clamping shoes 14, e.g., for moving and removing the one or more clamping shoes from a welding area and to place them into a desired configuration (e.g., island welding, peripheral welding, etc.)

Once the one or more clamping shoes 14 have been placed, electromagnet 5 may be operated to cause generation of a magnetic field greater in magnitude than that of permanent magnets 45 relative to the one or more clamping shoes 14 (step 520). This results in the force of the electromagnet 5 overcoming the force of the permanent magnets 45 such that the one or more clamping shoes 14 become detached from clamping shoe placement system 3 and begin to exert clamping pressure upon the two or more sheets 12a, 12b, and the non-magnetic support 10.

Once the one or more clamping shoes 14 have been attracted to electromagnet 5 so as to exert clamping pressure on the at least two sheets 12a, 12b, and non-magnetic support 10, clamping shoe placement system 3 may be withdrawn such that no optical obstruction remains while the at least two sheets remain clamped (step 525).

Following application of clamping pressure, controller 100 may receive signals from sensors present in non-magnetic support 10, among others. For example, controller 100 may receive a pressure signal from a pressure sensor to determine the current clamping pressure. Controller 100 may also receive a magnetic flux signal from a magnetic flux sensor so as to determining the current magnetic flux passing through the non-magnetic support 10. Such signals may enable controller 100 to manipulate certain variables associated with welding fixture 1 (e.g., current flowing in the windings of electromagnet 5) to optimize welding conditions (e.g., clamping pressure between 20 kPa and 45 kPa).

Welding is then performed on a weld line in the vicinity of a periphery of the one or more clamping shoes 14 without repositioning the one or more clamping shoes 14 (step 530). For example, a complete 360 degree weld around a circle or a weld around all four sides of a rectangle may be completed without repositioning of the one or more clamping shoes 14, the two or more sheets 12a, 12b, and/or other elements of welding system 2.

Following completion of the welding operation executed at step 530, the clamping shoe placement system 3 may be repositioned in proximity to the one or more clamping shoes 14 (e.g., by robotic control) (step 535). For example, clamping shoe placement system 3 may be positioned substantially identically to its position prior to activation of electromagnet 5 at step 515 above.

With permanent magnets 45 once again in proximity, or even in contact, with one or more clamping shoes 14, electromagnet 5 may be deactivated or reduced in power, such that the magnetic field of permanent magnets 45 exceeds that of electromagnet 5, and the one or more clamping shoes 14 are retained by permanent magnets 45 of clamping shoe placement system 3 (step 540). Clamping shoe placement system 3 may then be displaced sufficiently such that the one or more clamping shoes 14 are removed from the fixture 1, and to allow removal of the at least two sheets of material, now welded, from non-magnetic support 10 (step 545).

The steps may then be repeated accurately and efficiently, enabling production on a mass scale with consistency.

Importantly, controller 100 or other similar device may be configured to control movements associated with robotic components (not shown) of welding system 2, e.g., clamping shoe placement system 3, electromagnet 5, welding device 22, etc, such that welding steps may be repetitively and accurately carried out (e.g., for mass manufacturing) without or substantially without intervention from an operator. Alternatively, or in combination with controller 100, certain elements of the welding methods described herein may be carried out manually by an operator, as desired.

Controller 100 may be configured to communicate with the various systems via wireless and/or wired communications as desired. For example, controller 100 may be wired to welding device 22 via cable 67, while being wirelessly connected (e.g., via RF interfaces) to welding fixture 1 and clamping shoe placement system 3 via indicated optional connection 65.

Throughout the description, including the claims, the term "comprising a" should be understood as being synonymous with "comprising at least one" unless otherwise stated. In addition, any range set forth in the description, including the claims should be understood as including its end value(s) unless otherwise stated. Specific values for described elements should be understood to be within accepted manufacturing or industry tolerances known to one of skill in the art, and any use of the terms "substantially" and/or "approximately" and/or "generally" should be understood to mean falling within such accepted tolerances.

Where any standards of national, international, or other standards body are referenced (e.g., ISO, etc.), such references are intended to refer to the standard as defined by the national or international standards body as of the priority date of the present specification. Any subsequent substantive changes to such standards are not intended to modify the scope and/or definitions of the present disclosure and/or claims.

Although the present disclosure herein has been described with reference to particular embodiments, it is to be understood that these embodiments are merely illustrative of the principles and applications of the present disclosure.

It is intended that the specification and examples be considered as exemplary only, with a true scope of the disclosure being indicated by the following claims.

The invention claimed is:

1. A welding fixture, comprising:
an electromagnet;
a non-magnetic support configured to receive at least two sheets of material to be welded; and
one or more clamping shoes configured to cooperate with the electromagnet to apply a clamping pressure to the at least two sheets of material and the non-magnetic support as a result of a magnetic force produced by the electromagnet;
wherein a first of the at least two sheets of material is in contact with at least one of the one or more clamping shoes, and wherein a second of the at least two sheets of material is in contact with at least the non-magnetic support, the one or more clamping shoes being shaped such that a perimeter defined by the one or more clamping shoes is located in the vicinity of a defined weld line to be welded on the at least two sheets of material, the weld line remaining substantially free from optical obstruction during production of the magnetic force.

2. The welding fixture of claim 1, further comprising a laser welding device or an electron beam welding device.

3. The welding fixture of claim 2, wherein the laser welding device is a scanning laser.

4. The welding fixture of any of claims 1, wherein the laser welding device is configured for at least one of stake welding and lap welding.

5. The welding fixture of any of claim 1, wherein the at least two sheets of material have a thickness less than 1.0 millimeter, preferably less than 0.5 millimeter.

6. The welding fixture of claim 1, wherein the one or more clamping shoes comprises a plurality of peripheral clamping shoes and a central clamping shoe surrounded by the plurality of peripheral clamping shoes.

7. The welding fixture of claim 1, where the one or more clamping shoes are mobile components.

8. The welding fixture of claim 1, wherein the electromagnet is comprised of a plurality of electromagnets.

9. The welding fixture of claim 1, wherein at least one of the at least two sheets of material comprises titanium.

10. The welding fixture of claim 1, wherein the clamping pressure ranges from 20000 pascals to 40000 pascals based on a design of the one or more clamping shoes.

11. A welding system, comprising:
a welding fixture comprising:
an electromagnet;
a non-magnetic support configured to receive at least two sheets of material to be welded;
one or more clamping shoes configured to cooperate with the electromagnet to apply a clamping pressure to the at least two sheets of material and the non-magnetic support as a result of a magnetic force produced by the electromagnet; and
a clamping shoe placement system comprising:
a permanent magnet configured to attract the one or more clamping shoes.

12. The welding system of claim 11, wherein the permanent magnet presents a magnetic field of lesser magnitude than that of the electromagnet in an operational state, relative to the clamping shoes.

13. The welding system of claim 11, further comprising a laser welding device or an electron beam welding device.

14. The welding system of claim 13, wherein the laser welding device is a scanning laser.

15. The welding system of claim 11, wherein the permanent magnet is comprised of a plurality of permanent magnets aligned to the one or more clamping shoes.

16. The welding system of claim 11, wherein the electromagnet is comprised of a plurality of electromagnets.

17. The welding system of claim 11, wherein at least one of the at least two sheets of material comprises titanium.

18. The welding system of claim 11, wherein the clamping pressure ranges from 20000 pascals to 40000 pascals based on a design of the one or more clamping shoes.

19. A method for welding two or more sheets of material, comprising:
   supporting the two or more sheets of material on a non-magnetic support, the non-magnetic support being located between the two or more sheets of material and an electromagnet;
   positioning one or more clamping shoes retained by a clamping shoe placement system such that the one or more clamping shoes contact at least one of the two or more sheets of material, the clamping shoe placement system comprising a permanent magnet for attracting the one or more clamping shoes;
   operating the electromagnet to generate a magnetic force greater in magnitude than that of the permanent magnet relative to the one or more clamping shoes; and
   withdrawing the clamping shoe placement system.

20. The method of claim 19, further comprising welding the two or more sheets of material with a laser welding device or an electron beam welding device.

21. The method of claim 20, wherein the welding is performed around a periphery of a weld line without repositioning the one or more clamping shoes.

22. The method of any of claim 19, further comprising:
   repositioning the clamping shoe placement system in proximity to the one or more clamping shoes;
   deactivating the electromagnet such that the one or more clamping shoes are retained by the clamping shoe placement system; and
   removing the at least two sheets of material from the non-magnetic support.

* * * * *

UNITED STATES PATENT AND TRADEMARK OFFICE
CERTIFICATE OF CORRECTION

PATENT NO. : 9,555,522 B2
APPLICATION NO. : 14/760802
DATED : January 31, 2017
INVENTOR(S) : Paul Evans et al.

It is certified that error appears in the above-identified patent and that said Letters Patent is hereby corrected as shown below:

In the Claims

At Column 10, Line 36, change "fixture of any of claims 1," to "fixture of claim 1,"

At Column 10, Line 39, change "fixture of any of claim 1," to "fixture of claim 1,"

At Column 12, Line 17, change "method of any of claim 19," to "method of claim 19,"

Signed and Sealed this
Twenty-fourth Day of July, 2018

Andrei Iancu
*Director of the United States Patent and Trademark Office*